(No Model.)
P. S. PAINE.
PREPARATION FOR CLEARING COFFEE.
No. 257,513. Patented May 9, 1882.
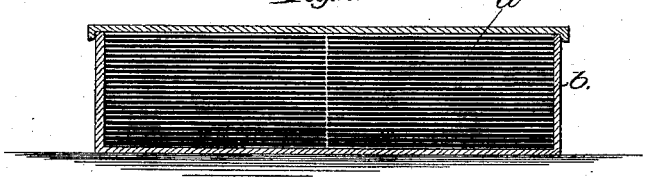
Witnesses.
John F. C. Brainkirk
Bernice J. Noyes.
Inventor.
Phebe S. Paine
By Crosby & Gregory
Atty.

UNITED STATES PATENT OFFICE.

PHEBE S. PAINE, OF BOSTON, MASSACHUSETTS.

PREPARATION FOR CLEARING COFFEE.

SPECIFICATION forming part of Letters Patent No. 257,513, dated May 9, 1882.

Application filed December 19, 1881. (No specimens.)

*To all whom it may concern:*

Be it known that I, PHEBE S. PAINE, of Boston, Suffolk county, State of Massachusetts, have invented an Improvement in Preparation for Clearing Coffee, of which the following description, in connection with the accompanying drawings, is a specification.

This invention has for its object the production of a desirable and effective material for clearing coffee, the material giving the coffee a clear and sparkling appearance by precipitating all of the grounds.

The material the subject of my invention consists of albumenized fish-skin, or fish-skin combined with the white of egg. As is well known, fish-skin has long been used for the purpose in question in places where it could be easily procured. Eggs are also used for the same purpose; but there are objections to these articles when used separately which do not exist when used in combination. Fish-skin alone will settle coffee; but great prejudice against its use exists in the minds of many persons on account of the rank, fishy taste it is liable to impart to the coffee, and it also gives the coffee a flat, dead appearance. Experience proves that the use of an egg reduces in a marked degree the strength of the coffee, thus making it necessary to use a greater amount of raw coffee to obtain a desirable degree of strength than would be necessary in the use of the white of egg used in connection with fish-skin. The great expense of eggs at certain seasons of the year makes it impracticable for many families to avail themselves of them.

In preparing this clarifying material I take fish-skin, and after washing and thoroughly cleansing it I dry the same and then coat it with albumen or white of egg one or more times, drying after each application. It is then cut into pieces of suitable size for use. This clarifying material is in every way as effective as an egg, costs less, and is put up in a form always available and ready for use. It may be kept for any reasonable length of time without injury, is perfectly adapted for use in any climate, and its lightness and compact form render it easy of transportation. The material may be cut in any suitable manner into pieces of any desired shape or size for boxing.

In the accompanying drawings, Figure 1 shows a piece of the albumenized fish-skin, and Fig. 2 shows several such pieces placed in compact form in a box.

In the drawings *a* represents the albumenized fish-skin, and *b* the box holding a number of pieces, *a*.

Instead of applying white of egg to the dried skin, which I prefer to do, as I think it will keep longer and lessen the shrinking of the skin, I may apply the same to the cleansed skin in a moist state. In either case the prepared skin is equally effective.

I am aware the albumen may be produced from other things than eggs, and in this my invention I intend to include any known albuminoids.

I claim—

The herein-described product for use in clearing coffee, the same consisting of fish-skin coated with white of eggs or like albuminous matter.

In testimony whereof I have signed my name to this specification in the presence of two subscribing witnesses.

PHEBE S. PAINE.

Witnesses:
G. W. GREGORY,
W. H. SIGSTON.